US010767633B2

(12) United States Patent
Narayanan

(10) Patent No.: US 10,767,633 B2
(45) Date of Patent: Sep. 8, 2020

(54) METHOD AND SYSTEM FOR DETERMINING THE DYNAMIC TWIST OF A WIND TURBINE BLADE

(71) Applicant: VESTAS WIND SYSTEMS A/S, Aarhus N (DK)

(72) Inventor: Srikanth Narayanan, Cowes (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 554 days.

(21) Appl. No.: 15/539,557

(22) PCT Filed: Dec. 22, 2015

(86) PCT No.: PCT/DK2015/050414
§ 371 (c)(1),
(2) Date: Jun. 23, 2017

(87) PCT Pub. No.: WO2016/101961
PCT Pub. Date: Jun. 30, 2016

(65) Prior Publication Data
US 2017/0356425 A1    Dec. 14, 2017

(30) Foreign Application Priority Data

Dec. 23, 2014    (DK) .................................. 2014 70827

(51) Int. Cl.
*F03D 17/00*    (2016.01)
*F03D 7/02*    (2006.01)

(52) U.S. Cl.
CPC ........... *F03D 17/00* (2016.05); *F03D 7/0224* (2013.01); *F05B 2240/311* (2013.01);
(Continued)

(58) Field of Classification Search
CPC ..................................................... F03D 7/0224
See application file for complete search history.

(56) References Cited

U.S. PATENT DOCUMENTS

2006/0067828 A1    3/2006    Wetzel
2009/0266160 A1    10/2009    Jeffrey et al.
(Continued)

FOREIGN PATENT DOCUMENTS

CN    102102622 A    6/2011
CN    102900611 A    1/2013
(Continued)

OTHER PUBLICATIONS

Nrel et al: "National Renewable Energy Laboratory Innovation for Our Energy Future Subcontract Report Determination of Elastic Twist in Horizontal Axis Wind Turbines (HAWTs) Final Report: Aug. 1989", Aug. 1, 1989.
(Continued)

*Primary Examiner* — Manuel A Rivera Vargas
(74) *Attorney, Agent, or Firm* — Patterson + Sheridan, LLP

(57) ABSTRACT

The present invention relates to a method and wind turbine for determining a dynamic twist of one or more blades. One or more first signals are received from a first wireless sensor attached to a blade of a wind turbine and a first angle is determined based on the received first signals. One or more second signals are received from a second wireless sensor attached to a blade of a wind turbine and spaced apart from the first wireless sensor by a predetermined distance. A second angle is determined based on the received second signals. A dynamic twist of the blade is determined based on the determined first angle, the determined second angle and the predetermined distance.

19 Claims, 4 Drawing Sheets

(52) U.S. Cl.
CPC ..... *F05B 2260/74* (2013.01); *F05B 2270/328* (2013.01); *F05B 2270/331* (2013.01); *F05B 2270/802* (2013.01); *F05B 2270/807* (2013.01); *Y02E 10/721* (2013.01); *Y02E 10/723* (2013.01)

(56) References Cited

U.S. PATENT DOCUMENTS

2011/0285129 A1* 11/2011 Li .............................. F03D 1/06 290/44
2013/0195657 A1   8/2013  Lauritsen et al.
2013/0302161 A1  11/2013  Koerber et al.

FOREIGN PATENT DOCUMENTS

| WO | 2009143848 A2 | 12/2009 |
| WO | 2011134473 A1 | 11/2011 |
| WO | 2013110215 A1 | 8/2013 |

OTHER PUBLICATIONS

International Search Report for PCT/DK2015/050414, dated Mar. 10, 2016.
Danish Search Report for PA 2014 70827, dated Jul. 14, 2015.
Chinese Office Action for Application No. 201560070765.5 dated Sep. 4, 2018.

* cited by examiner

METHOD AND SYSTEM FOR DETERMINING THE DYNAMIC TWIST OF A WIND TURBINE BLADE

The present invention relates to improvements to wind turbines and, in particular, to measuring dynamic twist of a wind turbine blade and determining a torsional load on the wind turbine blade.

Wind turbines effectively generate electrical power from wind energy. This is typically achieved by a wind turbine having one or more blades attached to a hub which rotate under influence of the wind. The rotational energy of the blades is converted into electrical power by a generator, typically located in a nacelle of the wind turbine.

However, aerodynamic forces caused by the wind significantly affect the wind turbine and, in particular, the wind turbine blades. The aerodynamic forces generate loads in the wind turbine components, e.g. blades, hub, nacelle, tower, and so on, which may degrade performance of the wind turbine, may affect control and operation of the wind turbine, and may increase fatigue and wear in the wind turbine components.

The aerodynamic forces caused by the wind, in particular wind shear, can subject the wind turbine blades to bending and twist moments, such as dynamic twist which is a measure of the force that is causing the blade to twist. The dynamic twist that the blades are subjected to, in combination with the material used to construct the blades, can contribute towards a torsional load (which may also be referred to as torsional moment) in the blades.

The effective torsional load can be distributed along the blade and may continuously vary due to the variation in aerodynamic forces and the material stiffness of the blade over time.

The dynamic twist can affect the control of the pitch of the blades, and the torsional loads the dynamic twist may cause can degrade the performance of the wind turbine, for example, affect control of aero-elastic stability of the wind turbine blades. In this respect aero-elasticity is the interaction of various aerodynamic forces with the structural properties of the wind turbine blades and aero-elastic stability relates to ensuring that the interaction does not cause any abnormal vibrations or forces that are critical to the operation and may cause damage to the turbine or may stop the turbine operation.

Accordingly, the dynamic twist of the blades is a significant problem for wind turbine operation and control.

The present invention seeks to address, at least in part, any or all of the problems described hereinabove.

According to a first aspect of the present invention there is provided a method comprising: receiving one or more first signals from a first wireless sensor attached to a blade of a wind turbine; determining a first angle based on the received first signals; receiving one or more second signals from a second wireless sensor attached to a blade of a wind turbine and spaced apart from the first wireless sensor by a predetermined distance; determining a second angle based on the received second signals; and determining a dynamic twist of the blade based on the first angle, the second angle and the predetermined distance.

Therefore, the dynamic twist of the blade to which the wireless sensors are attached can be measured and determined. Based on the difference between the angles measured by the wireless sensor and the predetermined distance between the two wireless sensors the dynamic twist of the blade can be determined.

The first angle may be a measurement of a change in angle with respect to time of the surface of the blade measured by the first wireless sensor; and the second angle may be a measurement of a change in angle with respect to time of the surface of the blade measured by the second wireless sensor.

The wireless sensors may measure a change in angle with respect to time of the surface of the blade to which it is attached. The measurement may be a voltage level which is indicative of the angle of the blade at the wireless sensor.

The dynamic twist may be determined by the following equation:

$$d\theta/dL$$

wherein $d\theta$ is the difference between the first and second angle and $dL$ is the predetermined distance.

The method may further comprise dividing the blade into one or more sections; and positioning at least two wireless sensors at each section. The blade may be divided into one or more sections to enable a determination of the dynamic twist and subsequently torsional load, at each section. The sections may be predefined or predetermined and may be chosen to monitor the dynamic twist/torsional load at sections of interest on the blade.

The method may further comprise compensating for the determined dynamic twist in a pitch angle request signal.

The dynamic twist may be used in feedback control for the requested pitch angle signal from the wind turbine controller. The dynamic twist may be used as an error signal for determining the pitch angle request signal.

The method may further comprise determining a torsional load based on the determined dynamic twist.

The torsional load may be determined by the following equation:

$$T = GJ\theta/L$$

where:
T is the torsional load;
G is the shear modulus or modulus of rigidity of the material of the blade,
J is a sectional second moment of area,
GJ is a Torsional stiffness,
$\theta$ is an angle of dynamic twist, and
L is a length of the blade over which the torsional load is applied.

The values of G, J and L may be stored in memory and retrieved from memory to enable the determination of the torsional load.

The method may further comprise measuring a flapwise moment of the blade; and monitoring a coupling frequency between flapwise moments of the blade and the torsional load based on the determined torsional load and the flapwise moment.

The flapwise moment may be measured using a load sensor on the blade. Monitoring the coupling frequency may comprise identifying a peak in the measured flapwise moments; identifying a peak in the measured torsional load; determining the coupling frequency if the identified peak in the measured flapwise moments is at least substantially aligned with the identified peak in the measured torsional load.

The method may further comprise performing a corrective action to at least substantially prevent the coupling frequency.

The method may further comprise identifying a peak in the measured torsional load; and performing a corrective action if the identified peak in the measured torsional load exceeds a predetermined threshold.

The corrective action may be pitching out one or more wind turbine blades.

The method may further comprise calibrating the wireless sensors; wherein the calibration may comprise:
(a) positioning the blade to a predetermined initial azimuth angle;
(b) pitching the blade to zero degrees;
(c) receiving measurements from one wireless sensor for a predetermined time period;
(d) determining an average the received measurements for the azimuth angle;
(e) positioning the blade to at least one further predetermined azimuth angle;
(f) repeating steps (b) to (d) for each of the further predetermined azimuth angles;
(g) determining a wireless sensor offset as an average of all determined average of the received measurements for each azimuth angle for the wireless sensor;
(h) repeating steps (a) to (g) for each wireless sensor attached to the blade; and
(i) repeating steps (a) to (h) for each blade.

The wireless sensor may comprise at least one of a MEMS gyroscope and a MEMS accelerometer.

According to a second aspect of the present invention there is provided a wind turbine comprising: a hub and one or more wind turbine blades attached to the hub; at least two wireless sensors attached to a wind turbine blade; and a wind turbine controller configured to implement any one of the functions or features of the method of the first aspect of the present invention.

The wireless sensor may comprise at least one of a MEMS gyroscope and a MEMS accelerometer.

The wind turbine may further comprise one or more Radio Frequency transmitters in the hub for charging a battery in the wireless sensor.

The wind turbine may further comprise a receiver in the hub for receiving one or more signals from the wireless sensors.

Embodiments of the present invention will now be described, by way of example only, and with reference to the accompanying drawings, in which.

Figure 1:
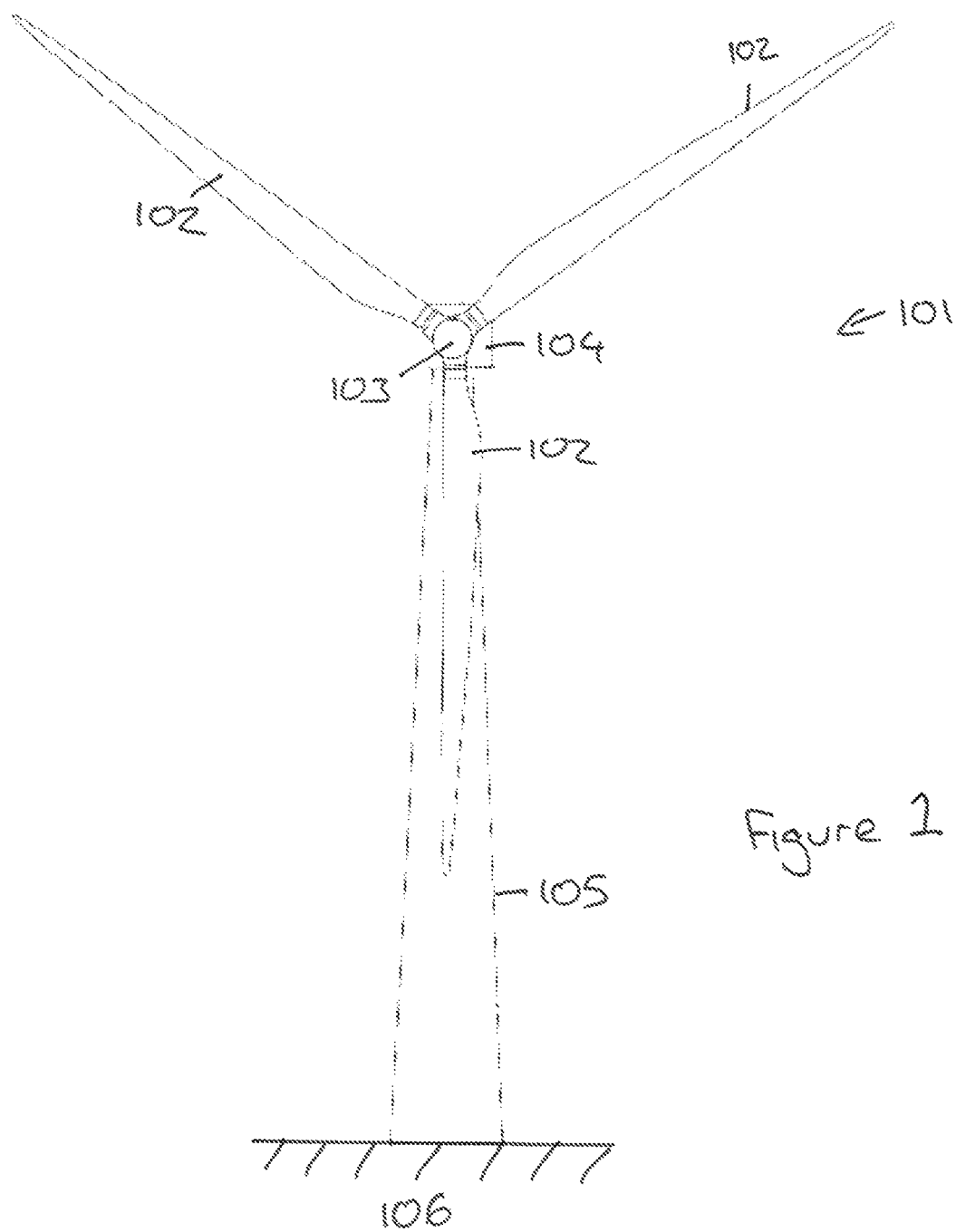
FIG. 1 shows a simplified schematic of a wind turbine according to many of the embodiments of the present invention.

With reference to FIG. 1, a typical wind turbine 101 comprises one or more blades 102. In FIG. 1, there is shown three blades 102 however, the wind turbine may comprise any number of blades suitable for the purpose and design of the wind turbine. In the following examples, the wind turbine comprises three blades however, as a person skilled in the art will appreciate, the invention is applicable to a wind turbine with any number of blades.

The wind turbine blades are typically attached to a hub 103 which in turn is connected to a nacelle 104. The nacelle 104 typically sits on top of a tower 105 which connects the wind turbine 101 to its foundations 106 (e.g. solid foundations, offshore foundations, floating platforms, and so on).

FIG. 1 shows a Horizontal Axis Wind Turbine (HAWT) however, the invention described herein is also applicable to a Vertical Axis Wind Turbine (VAWT).

In a simplified view, during operation of a wind turbine 101 the impacting wind energy causes the wind turbine blades 102 to rotate which rotates one or more drive shafts connecting the hub to a generator. The generator generates electrical power which may then be fed to an electrical grid.

Whilst the blades are rotating they may be subject to several forces. For example, forces that may be affecting a wind turbine blade can include a pitching force, bending in both flapwise and edgewise directions due the nature of the material from which blades are manufactured, and wind shear effects during operation of the wind turbine.

These forces may contribute to a dynamic twist of the blade which may cause a torsional load on the turbine blade. The torsional load may vary along the length of the blade due to a different or varying torsional stiffness of the blade material along its length. The variations in the torsional stiffness due to varying loads make the torsional load measurement complex.

The torsional load (T) on the blade is given by the general formula:

$$T = GJ\theta/L$$

where:
G—shear modulus or modulus of rigidity of the material, which is defined as the ratio of shear stress to shear strain,
J—sectional second moment of area, wherein the second moment of area is a geometrical property of an area which reflects how its points are distributed with regard to an arbitrary axis. The second moment of area is typically denoted with either an I for an axis that lies in the plane or with a J for an axis perpendicular to the plane,
GJ—Torsional stiffness, wherein the torsional stiffness is product of Shear modulus and Second moment of area,
θ—The angle of dynamic twist at the cross section, and
L—The length of the object over which the torsional load is applied.

This above-mentioned formula primarily holds for a beam made of isotropic material where pure torsional load occurs and other combined forces are not present.

However, as wind turbine blades are generally made of anisotropic composite material varying in thickness and properties along the length of the blade. Accordingly, the parameter GJ may vary along the length of the blade and therefore the blade may experience a varying torsional load due to stochastic nature of the wind.

As the torsional load varies along the length of the wind turbine blade then it is preferable to measure the dynamic twist and determine the torsional load at one or more different sections of the blade.

Figure 2A:
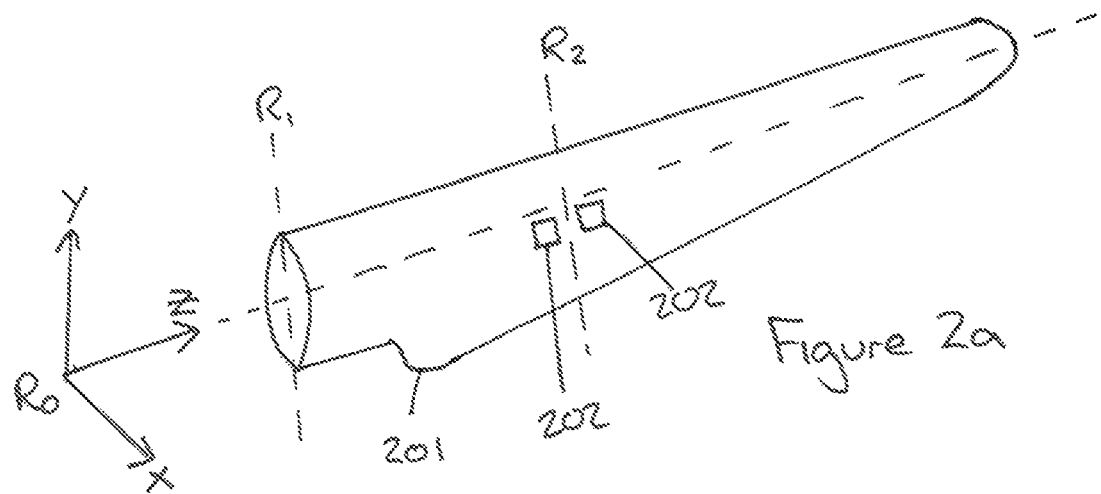
FIGS. 2a and 2b show a simplified schematic of predetermined sections for a wind turbine blade according to many of the embodiments of the present invention.
Figure 2B:
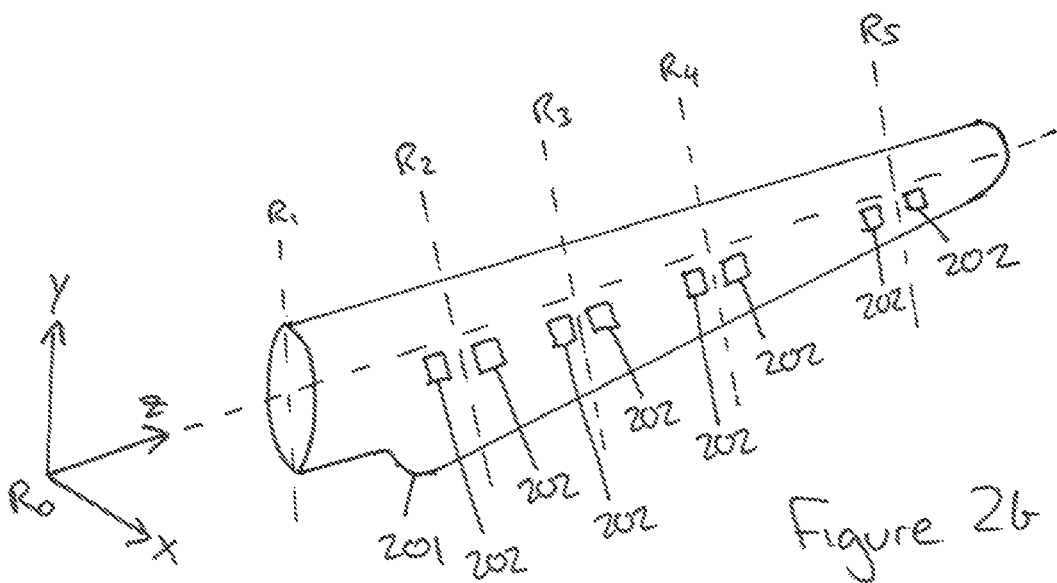

In the following examples and embodiments of the present invention, a section is defined as a cross-sectional area of the blade at a point that is at a predefined distance along the radial direction of the blade. In a wind turbine co-ordinate system, as shown in FIGS. 2a and 2b, the Z axis is defined as being along the length of the blade, i.e. along the radial direction of the blade. Typically, the centre of the hub R0 is the origin of the co-ordinate system, being 0, 0, 0 in the X, Y and Z co-ordinates and therefore the blade root starts at a particular distance R1 along the Z axis.

There may be predefined any number of blade sections wherein each section corresponds to an area or point of interest for the purpose of determining the torsional load acting on the blade.

A first section R2 may therefore also be considered as a point on the blade at a predetermined distance from the root of the blade R1 with subsequent sections at a predetermined distance from the previous section and the blade may be divided into one or more sections.

With reference to FIG. 2a, there may be defined only one section R2 on the blade 201 which, for example, may be 40 metres from the blade root co-ordinate R1 in the radial direction along the Z axis of the blade. In this example, measurements of the torsional load would therefore be made at R2 (as will be described in more detail below) by two wireless sensors 202 positioned either side of the section point R2.

In another example, the blade 201 may be divided into several predefined sections R2 to R5 in FIG. 2b. The first section R2 may be 20 metres from the blade root R1, the second section R3 may be 10 metres from R2, the third section R4 may be 10 metres from R3, and the fourth section R5 may be 15 metres from R4. In this example, measurements would then be made of the torsional load at each of those sections R2 to R5 (as will be described in more detail below) by two wireless sensors positioned either side of each section points R2 to R5.

However, as will be appreciated, there may be any number of sections predefined, so as to allow the sensors to be attached at the required positions in the blade, depending on the resolution and areas of interest on the blade for measuring the torsional load. The distance between the sections are user-defined depending on the size of the blade and the number of torsional load measurements required.

In order to improve the control of the wind turbine during operation, for example, controlling aero-elastic instability flutter and to improve wind turbine performance by Angle of Attack/Twist control (described in more detail below), the effects of the dynamic twist affecting the blades are to be measured and taken into account by the wind turbine controller.

Figure 3:
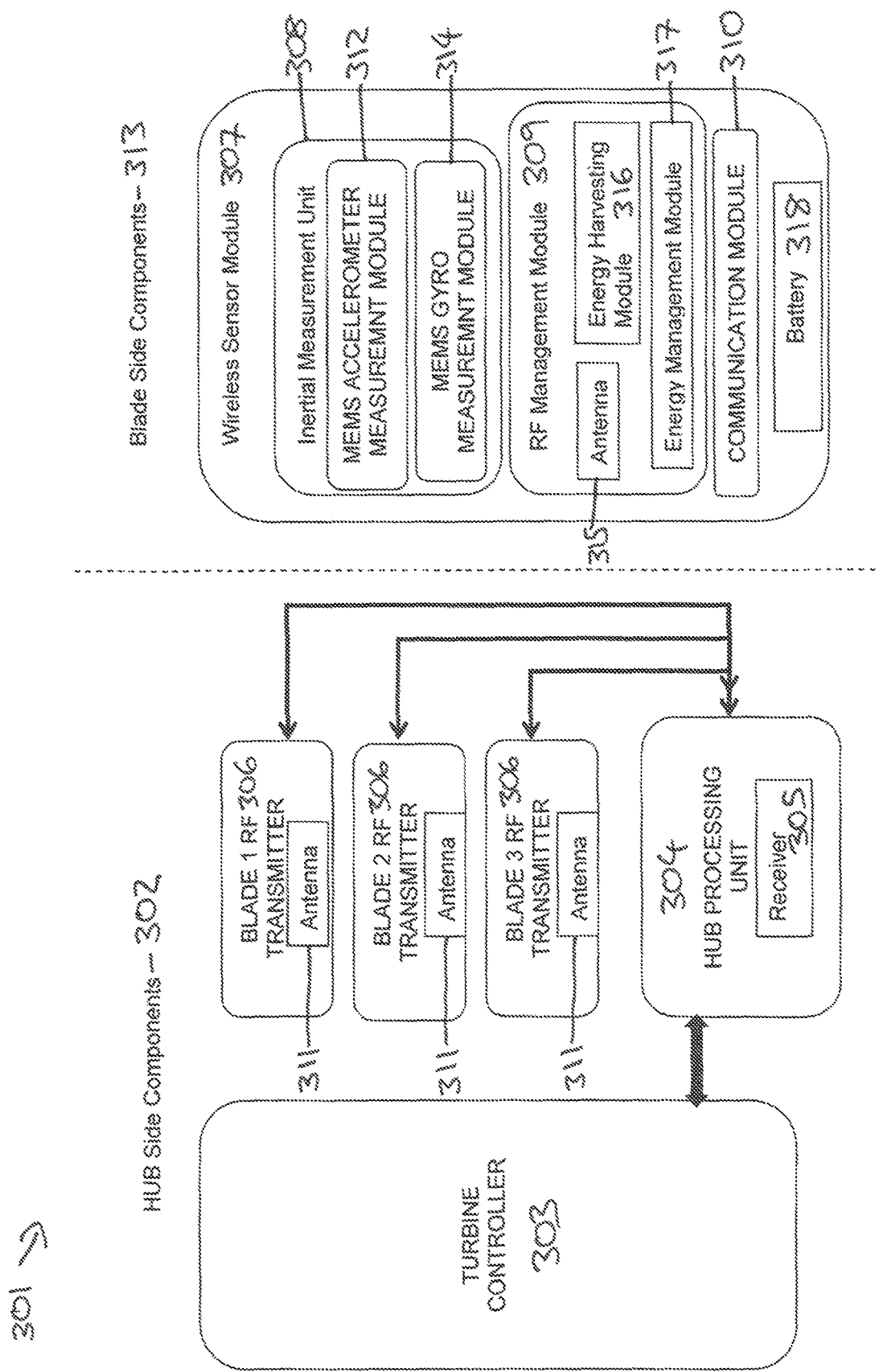
FIG. 3 shows a schematic of an arrangement for a dynamic twist measurement system according to many of the embodiments of the present invention.

The dynamic twist measurement system 301 is shown schematically in FIG. 3 and according to many of the embodiments of the present invention may comprise components in the hub and components in the blade.

However, as will be appreciated, the components described hereinbelow as being located in the hub of the wind turbine, may be solely located in the hub, or may be distributed between the hub and the nacelle, or may be solely located in the nacelle.

The hub side components 302 include a turbine controller 303, a processing unit 304, a receiver 305, and one or more transmitters 306.

The turbine controller 303 may be wind turbine main controller or may be any controller for the purpose of the present invention. The functionality described hereinbelow for the turbine controller 303 may be implemented by a single controller (e.g. a processor), or may be distributed between two or more controllers (e.g. processors).

The receiver 305 includes an antenna for receiving signals from one or more wireless sensor modules located in at least one blade. The receiver 305 may be, for example, a ZigBee© receiver, but may also be any suitable receiver for receiving signals from the wireless sensors in the blades.

The processing unit 304 may include a microcontroller or processor and memory circuits in order to receive and store, at least temporarily, one or more signals from the wireless sensor modules in the blades. The processing unit 304 may synchronise the signals received from the wireless sensors in the blades via, or in cooperation with, the receiver 305. The processing unit 304 may also transmit the received signals, or data indicative of the received signals, to the turbine controller 303.

The one or more transmitters 306 may be any suitable transmitter to transmit Radio Frequency (RF) signals to the one or more wireless sensor modules in one or more blades.

There may be provided a transmitter 306 for each blade within which there is located one or more wireless sensor modules. Accordingly, in this example, there are three wind turbine blades and therefore three transmitters 306, one for each blade, are provided. However, as will be appreciated, one or more transmitters may serve or be in operable contact with two or more blades housing one or more wireless sensor modules.

Each transmitter 306 is connected to one or more antennas 311, and in FIG. 3 there are shown three antennas 311 each connected to one corresponding transmitter 306.

The transmitters 306 via antennas 311 may continuously, periodically, or when required, transmit RF signals to the wireless sensor modules in one or more blades to provide energy to charge a battery within the wireless sensor module. This method of charging a battery via RF signals is known in the art and therefore not described in detail here. In this example, there is a transmitter/antenna arrangement for each blade and therefore the transmitter/antenna arrangement corresponding to a given blade provides the RF signals to the wireless sensor modules in that blade for charging the battery within of the wireless sensor module within that blade.

If one transmitter 306 or antenna 311 fails then the wireless sensor modules will continue to be powered to a certain limited time period due to the remaining charge within the battery.

Alternatively or additionally, the wireless sensor modules located in the blades may include a battery which is charged via solar panels, kinetic energy, wired electrical connections, and so on.

The processing unit 304, receivers 305, transmitters 306 and antennas 311 are shown in FIG. 3 as being separate components. However, as will be appreciated, these components of the torsional load measurement system 301 may be separate components, or combined with one or more of the other components, for example the transmitter and antenna may be a single unit or module. Accordingly, the functionality of the components (processing unit 304, receiver 305, transmitter 306 and antenna 311) may be separate, distributed or combined in any combination.

The blade side components 313 comprise a Wireless Sensor module 307.

The Wireless Sensor module 307 may include a wireless sensor 308, a Radio Frequency (RF) management module 309, and a wireless communication module 310.

The wireless sensor 308 may be an Inertial Measurement Unit (IMU) which comprises a Micro-Electro-Mechanical System (MEMS) Gyroscope sensor 314 and a MEMS accelerometer 312.

A MEMS device is one that, in general, is a miniaturized mechanical and electro-mechanical device.

A gyroscope is a device suitable for measuring an orientation of the structure or element to which the gyroscope is attached. Typically, the MEMS gyroscope sensor 314 measures the change rate of angle with respect to time. The use of a gyroscope enables an accurate determination of the orientation of the structure to which it is attached in a 3-Dimensional (3D) space.

The MEMS accelerometer 312 measures the rate of change of velocity with respect to time.

Accordingly, the Wireless Sensor 308, which may be an IMU that comprises a combination of a MEMS gyroscope and a MEMS accelerometer, provides a measurement of a change in angle θ with respect to time of the surface of the structure to which the Wireless Sensor 308 is attached from a calibrated reference or origin position, which may be referred to as the roll, pitch and yaw in three axis of the device and this measurement is available on all three major axis of the module.

Alternatively, any suitable wireless sensor 308 for measuring the orientation of the blade can be used or implemented in the blades. The Wireless Sensor 308 has been described as an Inertial Measurement Unit which includes both a MEMS gyroscope and a MEMS accelerometer; however, in other implementations the IMU may only include a MEMS gyroscope.

The RF management module 309 of the Wireless Sensor module may comprise an RF receiver antenna 315, energy harvesting module 316, and an energy management module 317.

The energy harvesting module 316 may include circuitry or other hardware and/or software that converts a predetermined frequency of RF energy to Direct Current (DC) which can then be stored in a battery 318 to ensure that the wireless sensor, e.g. the MEMS gyroscope and/or MEMS accelerometer, has sufficient power to operate and measure the orientation of the blade.

The energy management module 317 may include circuitry or other hardware and/or software to select the right sampling frequency for taking the measurements (which may be altered depending on the current level of battery charge, e.g. full battery charge causes a higher sampling rate than a low battery charge), and for switching standby modes based on signals received from the processing unit in the hub.

The wireless communication module 310 transmits measured signals from the Wireless Sensor module to a receiver of the hub side components 302. The wireless communication may be based on, for example, ZigBee© which is based on the IEEE 802.15.4 standard.

The wireless sensor module 307 may also include a battery 318 which is charged via received RF signals from a transmitter/antenna in the hub/blade root. Alternatively, or additionally, the wireless sensor module 307 may also include a battery charged by one or more of solar power, kinetic power, and so on.

Each blade may include any number of Wireless Sensor modules 307 depending on the resolution and accuracy required along with the number of predefined sections that the blade is divided into. It is preferable to have a minimum of two Wireless Sensor Modules 307 per predefined section, however, as will be appreciated there may be any number of Wireless Sensor modules 307 per predefined section, e.g. 4, 6, 8, and so on, depending on the required resolution and accuracy of the measured dynamic twist and torsional load at each predefined section of the blade.

In the example of two Wireless Sensor modules per predefined section, the Wireless Sensor modules may be positioned on the inside surface of the blade structure and spaced apart by a small predetermined amount, for example, 100 to 200 mm from each other on either side of the given section point with alignment to the leading edge of the blade.

As will be appreciated the two or more wireless sensors may be positioned at any point on the blade inner surface either side of the predefined section point in the blade radial axis and may be spaced apart by suitable amount.

In this example, the wireless sensor modules 307 are provided in each of the three wind turbine blades in order to measure the dynamic twist and determine the torsional load on at least one section of each of the three blades.

In order to be able to determine or measure the dynamic twist and torsional load on a wind turbine blade, and in particular, on one or more predefined sections of the blade, at least two wireless sensors are attached to the blade at the cross-sectional area or point at which the section is predefined on the blade, e.g. at 30 metres from the root and so on. As the torsional load varies along the length of the blade then it is advantageous to determine or measure the torsional load on a given predefined section of the blade which is of interest and useful for determining the torsional load and for the improved control of the wind turbine.

As mentioned hereinabove, it is preferable to have a minimum of two wireless sensor modules in order to determine or measure the torsional load in a predefined section of the wind turbine blade.

In order to be able to obtain accurate measurements of the dynamic twist, e.g. the change in angle of the orientation of the section of the blade to which the wireless sensor modules are attached, the dynamic twist measurement system should first be calibrated.

Figure 4:
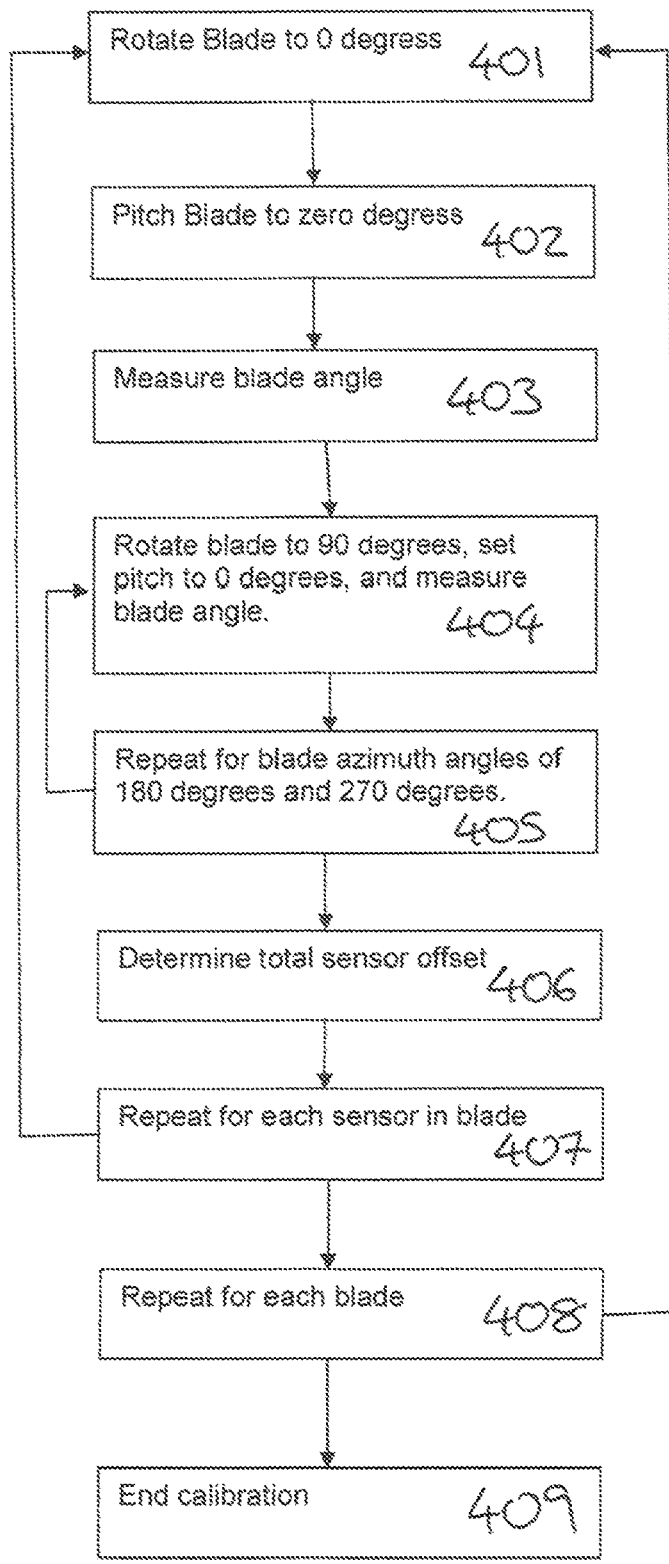
FIG. 4 shows a flow diagram of a calibration process according to many of the embodiments of the present invention.

The process for calibrating the dynamic twist measurement system is shown in FIG. 4.

In this example, a pair of wireless sensor modules are positioned or located at a predefined section of the blade In step 401, a first wind turbine blade, e.g. blade 1 is rotated to a predetermined initial position which in this example is a zero degree azimuth angle. Typically, the zero degree azimuth angle corresponds to a blade position in which the blade is positioned parallel to the tower and pointing vertically downwards. Rotating the blade to this position effectively eliminates the effects of the wind for the purpose of calibrating the sensors. As will be appreciated, the blades may be rotated to any predetermined initial position that is suitable for the calibration process.

In step 402 the turbine blade 1 may then be pitched to zero degrees, e.g. to the zero twist position.

In step 403 the sensor measurement with respect to pitch axis is taken and averaged for a predefined time period in order to measure the sensor offset at the blade azimuth angle.

The predefined time period may be, for example, 10 seconds, 20 seconds, 30 seconds, and so on. In this example, the predefined time period is 10 seconds, but as will be appreciated the predefined time period may be any time period suitable for the calibration process.

The measurements taken by the wireless sensor, e.g. measurements from the MEMS gyroscope and MEMS accelerometer, may be a voltage level which can be converted to an angle either in the wireless sensor module, in the hub processing unit, or in the wind turbine controller.

The sensor offset is the pitch angle above zero degrees. In other words, as the blade is pitched to zero degrees the sensor may be registering a pitch angle greater than zero degrees (e.g. the sensor offset) and as such the sensor can be calibrated by determining the sensor offset.

In step 404, blade 1 may then rotated to a 90 degree azimuth angle and the blade pitch may again be set to 0 degrees. The sensor measurement with respect to pitch axis is measured and averaged for a predefined time period in order to measure the sensor offset at the blade azimuth angle.

In step 405, the process of step 404 is repeated for blade 1 in azimuth angles of 180 and 270 degree azimuth respectively, therefore blade 1 pitch angle may be set to pitch of 0 degrees at each azimuth angle and the sensor offset at each azimuth angle can be measured.

The blade may be rotated to each azimuth angle using the generator in a motor mode, or by using wind energy. In these examples, the blades are rotated using the generator in a motor mode, which is known in the art.

In step 406, a total sensor offset is calculated by determining the mean or average of the offsets measured in each azimuth angle.

Accordingly, from steps 403 to 405 described hereinabove, the turbine controller receives and stores the measured offset for the first sensor, e.g. sensor 1, for each of the predefined azimuth angles and for zero degree pitch angle. Therefore, the system may store the following offsets:

Sensor_1_Blade_1_0azi_0pitch=Average (Sensor_1_Blade_1) for 10 seconds
Sensor_1_Blade_1_90azi_0pitch=Average (Sensor_1_Blade_1) for 10 seconds
Sensor_1_Blade_1_180azi_0pitch=Average (Sensor_1_Blade_1) for 10 seconds
Sensor_1_Blade_1_270azi_0pitch=Average (Sensor_1_Blade_1) for 10 seconds In the above offset measurements, the abbreviation azi refers to azimuth angle.

The total sensor 1 offset on blade 1 can then be determined as the average of the individual offset measurements at each azimuth angle. In other words:

Total_Sensor_1_Blade_1_offset=Average (Sensor_1_Blade_1_0azi_0pitch, Sensor_1_Blade_1_90azi_0pitch, Sensor_1_Blade_1_180azi_0pitch, Sensor_1_Blade_1_270azi_0pitch)

The steps 403 to 406 may then also be applied to each further sensor attached to the blade, in this example blade 1, in step 407. Alternatively, all sensor modules in one blade could be calibrated at the same time.

The same process as shown in the flowchart of FIG. 4 may also be applied to each of the wind turbine blades in step 408.

Thus, once the process or procedure shown in FIG. 4 has been performed for all relevant blades and for all relevant sensor modules within each blade then the dynamic twist measurement system is calibrated for operation 409.

The above described calibration process or procedure may be automated by the turbine control system as an automatic calibration routine.

During turbine operation the wireless sensor modules at each predefined section measure the angle with respect to time from its original position. The resultant measurement is, or indicative of, a signal of theta with respect to time. The dynamic twist measurement system is capable of synchronously measuring these signals from all of the wireless sensor modules in one or more blades.

Hence the output from the two sensors at particular section of the blade is a signal indicative of theta1 ($\theta 1$) with respect to time t1 and theta2 ($\theta 2$) with respect time t1. These signals are corrected for the calibrated offset to calculate the corrected theta in the hub processing unit or the wind turbine controller. The difference in the corrected theta1 ($\theta 1$) and theta2 ($\theta 2$) measurements is divided by the length or distance between the two sensors centre line which provides a continuous determination of the dynamic twist of a particular section.

Accordingly the Dynamic twist, where the dynamic twist is a measure of the force that is causing the blade to twist, at a particular section may be given by:

$$d\theta/dL$$

where d$\theta$ is the difference between the theta measurements by the two (or more) wireless sensors at the given section and dL is the distance between the two wireless sensors.

For example, if a section is predefined at 30 metres from the root of the blade, and a first wireless sensor module measuring theta 1 (or signals indicative of theta 1) is positioned at 30 metres and a second wireless sensor measuring theta 2 (or signals indicative of theta 2) is positioned at 30.1 metres, e.g. spaced apart by 10 cm at the section of interest, then the dynamic twist of that section can be determined as (theta 2−theta 1)/(30.1−30).

The torsional load may then be determined at a given section as:

Torsional load at a given section=$GJ$section*$(d\theta/dL)$ in $Nm$.

The GJ at particular section is a constant derived from the material used and geometric properties of the section and may be retrieved from memory by the wind turbine controller.

Once the torsional load of the blade at predefined sections is determined using the sensor system described hereinabove, the turbine controller may utilize the determined torsional load to improve the control and stability of the wind turbine operation.

The turbine controller may use the determined torsional load to improve, for example, the control of loads on the wind turbine blades. The torsional load measurement may be continuous or for periods of time that are of interest, for example, during certain wind conditions or other environmental and operating conditions. Whilst the torsional load is being measured, a continuous signal indicative of the torsional load is generated with respect to time and/or the values of the torsional load can be monitored with respect to time.

The wind turbine controller may store predefined thresholds which can be compared with the torsional load measurements to identify any potentially dangerous torsional loads on the blades which may cause damage to the wind turbine blades. If the torsional loads exceed the predefined threshold then the wind turbine controller may take corrective action, for example, pitching out the blades to reduce the torsional loads.

The turbine controller may also use the determined torsional load to improve, for example, the control of aeroelastic instability flutter.

Flutter is dynamic instability of wind turbine blades in a wind flow due to positive feedback between the rotor deflection and the forces from the wind. The rotor size of wind turbine blades is continuously increasing due to bigger sized turbines and increased performance. Flutter is a regular problem when designing rotors of a large size but it is typically extremely complicated to model and predict flutter.

In order to effectively avoid flutter the wind turbine may be actively controlled by measuring the torsional loads. In the event of a flutter in a wind turbine blade a coupling frequency occurs between flapwise moments and torsional moments of the blades.

Flapwise moment is the product of strain caused in the flap section of the blade and the flapwise stiffness (material property) of the blade and is a parameter that is typically measured on a wind turbine by, for example, load sensors in the blades. Measuring or monitoring flapwise moments with respect to time on a blade is known in the art and as such will not be discussed in detail.

If the wind turbine controller identifies peaks in the torsional load measurements that are aligned or substantially aligned, with peaks in the measured flapwise moments then a coupling frequency is identified and can be monitored.

In case of such a coupling frequency is identified in the measured flapwise moments and torsional loads in a given time period then corrective control action can be performed to safely avoid flutter on wind turbine blades. For example, the wind turbine controller may take corrective action to pitch out the blades, to de-rate the wind turbine or take any other control action to reduce or prevent flutter on the wind turbine blades.

Accordingly, by measuring the flapwise moments and the torsional loads affecting a wind turbine blade the wind turbine may be controlled to substantially reduce or eliminate flutter.

The turbine controller may also use the determined dynamic twist to improve wind turbine performance in respect of the Angle of Attack/Twist control of the blades. The turbine controller typically controls the blades during operation of the wind turbine optimize the blade pitch angle for energy production.

However, the effect of the dynamic twist or torsional load on the blade may cause a variation in the angle of attack between the actual angle of attack of the blade and the requested angle of attack by the turbine controller. This may therefore result in a reduced energy production than expected.

Accordingly, by determining the dynamic twist of at least one section of each blade then the turbine controller can continuously monitor the angle of attack of each blade, for example, if the requested pitch angle by the wind turbine controller is +30 degrees and the measured dynamic twist is +5 degrees then the effective angle of attack of the blade would be +35 degrees and not the requested angle of +30 degrees. By measuring and determining the dynamic twisty the turbine controller may therefore be able to compensate for the dynamic twist in the pitch angle request signal in order to obtain the required angle of attack. For example, the measured dynamic twist could be used in feedback control as an error signal to the requested pitch angle thereby compensating for the effects of the dynamic twist of the blade in the requested pitch angle signal.

As such, the improved control of the wind turbine during operation may therefore increase the aerodynamic performance of the turbine and increased annual energy production.

The actual angle of the blade can also be determined at any time by adding the measured dynamic twist to the pitch angle meaning that the actual angle of attack of the blade can be determined.

While embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method comprising:
receiving one or more first signals from a first wireless sensor attached to a blade of a wind turbine;
determining a first angle based on the one or more first signals;
receiving one or more second signals from a second wireless sensor attached to the blade and spaced apart from said first wireless sensor by a predetermined distance;
determining a second angle based on the one or more second signals;
determining a dynamic twist of said blade based on said first angle, said second angle and said predetermined distance;
determining a torsional load acting on the blade based on the dynamic twist; and
controlling the wind turbine to control one or more loads experienced by the blade based on the torsional load.

2. The method as claimed in claim 1, further comprising:
measuring a flapwise moment of said blade; and
monitoring a coupling frequency between flapwise moments of said blade and said torsional load based on said determined torsional load and said flapwise moment.

3. The method as claimed in claim 2 in which monitoring said coupling frequency comprises:
identifying a peak in said measured flapwise moments;
identifying a peak in the determined torsional load; and
determining said coupling frequency if said identified peak in said measured flapwise moments is at least substantially aligned with said identified peak in the torsional load.

4. The method as claimed in claim 2, wherein controlling the wind turbine comprises:
performing a corrective action to at least substantially prevent said coupling frequency.

5. The method as claimed in claim 4, in which said corrective action is pitching out one or more wind turbine blades.

6. The method as claimed in claim 1, in which said torsional load is determined by an equation comprising:

$$T = GJ\theta/L$$

where:
T is said torsional load;
G is a shear modulus or modulus of rigidity of a material of said blade,
J is a sectional second moment of area,
GJ is a Torsional stiffness,
θ is an angle of dynamic twist, and
L is a length of said blade over which said torsional load is applied.

7. The method as claimed in claim 6, further comprising:
retrieving from a memory a value of G, J and L.

8. The method as claimed in claim 1, in which said first angle is a measurement of a change in angle with respect to time of a surface of said blade measured by said first wireless sensor; and
said second angle is a measurement of a change in angle with respect to time of the surface of said blade measured by said second wireless sensor.

9. The method as claimed in claim 1, in which said dynamic twist is determined by an equation comprising:

$$d\theta/dL$$

wherein dθ is a difference between said first and second angle and dL is said predetermined distance.

10. The method as claimed in claim 1, further comprising:
dividing said blade into one or more sections; and
positioning at least two wireless sensors at each section.

11. The method as claimed in claim 1, further comprising: compensating for said determined dynamic twist in a pitch angle request signal.

12. The method as claimed in claim 1, further comprising: identifying a peak in the determined torsional load; and wherein controlling the wind turbine comprises:
   performing a corrective action if said identified peak in the determined torsional load exceeds a predetermined threshold.

13. The method as claimed in claim 1, further comprising: calibrating a plurality of wireless sensors comprising at least the first wireless sensor and the second wireless sensor; wherein said calibration comprises:
   (a) positioning said blade to a predetermined initial azimuth angle;
   (b) pitching said blade to zero degrees;
   (c) receiving measurements from one wireless sensor for a predetermined time period;
   (d) determining an average said received measurements for said azimuth angle;
   (e) positioning said blade to at least one further predetermined azimuth angle;
   (f) repeating steps (b) to (d) for each of said further predetermined azimuth angles;
   (g) determining a wireless sensor offset as an average of all determined average of said received measurements for each azimuth angle for the one wireless sensor;
   (h) repeating steps (a) to (g) for each wireless sensor attached to said blade; and
   (i) repeating steps (a) to (h) for each blade.

14. The method as claimed in claim 1, wherein at least one of the first wireless sensor and the second wireless sensor comprises at least one of a Micro-Electro-Mechanical System (MEMS) gyroscope and a MEMS accelerometer.

15. A wind turbine comprising:
   a hub and one or more wind turbine blades attached to said hub;
   at least two wireless sensors attached to a wind turbine blade of the one or more wind turbine blades; and
   a wind turbine controller configured to:
      receive one or more first signals from a first wireless sensor of the at least two wireless sensors;
      determine a first angle based on the one or more first signals;
      receive one or more second signals from a second wireless sensor of the at least two wireless sensor, wherein the second wireless sensor is spaced apart from the first wireless sensor by a predetermined distance;
      determine a second angle based on the one or more second signals;
      determine a dynamic twist of the wind turbine blade based on the first angle, the second angle and the predetermined distance;
      determine a torsional load acting on the wind turbine blade based on the dynamic twist; and
      control the wind turbine to control one or more loads experienced by blade based on the torsional load.

16. The wind turbine as claimed in claim 15, in which the at least two wireless sensors comprises at least one of a MEMS gyroscope and a MEMS accelerometer.

17. The wind turbine as claimed in claim 15, further comprising:
   one or more Radio Frequency transmitters in said hub for charging a battery in a wireless sensor of the at least two wireless sensors.

18. The wind turbine as claimed in claim 15, further comprising:
   a receiver in said hub for receiving one or more signals from said the at least two wireless sensors.

19. A method comprising:
   calibrating a plurality of wireless sensors attached to a blade of a wind turbine to determine a dynamic twist of the blade;
   receiving one or more first signals from a first wireless sensor of the plurality of calibrated wireless sensors;
   determining a first angle based on the one or more first signals;
   receiving one or more second signals from a second wireless sensor of the plurality of calibrated wireless sensors, wherein the second wireless sensor is spaced apart from the first wireless sensor by a predetermined distance;
   determining a second angle based on the one or more second signals; and
   determining a dynamic twist of said blade based on said first angle, said second angle and said predetermined distance.

* * * * *